United States Patent
Hsieh

(10) Patent No.: US 6,226,406 B1
(45) Date of Patent: May 1, 2001

(54) METHOD AND APPARATUS FOR HYBRID SAMPLING IMAGE VERIFICATION

(75) Inventor: Teh-Ming Hsieh, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/002,202

(22) Filed: Dec. 31, 1997

(51) Int. Cl.$^7$ .................................................. G06K 9/62

(52) U.S. Cl. .................... 382/209; 382/181; 382/219; 348/402; 348/408

(58) Field of Search .................................. 382/209, 181, 382/218, 219, 261, 278; 348/402–408; 358/429, 454, 456

(56) References Cited

U.S. PATENT DOCUMENTS

| | | | |
|---|---|---|---|
| 5,333,211 | * 7/1994 | Kanda et al. | 382/261 |
| 5,488,419 | * 1/1996 | Hui et al. | 348/402 |
| 5,890,808 | * 4/1999 | Neff et al. | 382/209 |
| 5,907,641 | * 5/1999 | Corvi et al. | 382/278 |

OTHER PUBLICATIONS

Sun Microsystems, Inc., "XGL Test Suite User's Guide", Sun Microsystems, Palo Alto, CA, pp. 1–12 (1995).

Frazier, et al. "OpenGL Conformance", Version 1.0.15, (1994).

* cited by examiner

Primary Examiner—Jose L. Couso
Assistant Examiner—Gregory Desire
(74) Attorney, Agent, or Firm—Beyer, Weaver & Thomas, LLP

(57) ABSTRACT

A method and apparatus are disclosed for testing the accuracy of images generated by a computer graphics program. An output image created by a graphics program on a particular computer platform is verified by being compared to a reference image, also known as the golden image. The output image is partitioned into several checking apertures where each such checking aperture can be of either a block type or a point type. In either case, each checking aperture is made up of several pixels. One or more attributes of the output image is compared against the reference image upon execution of a test program. For pixels in a point type checking aperture, a positional tolerance is determined. Expected values of pixels in the reference image are then derived by examining the specification of the computer graphics program. The positional tolerances and the expected values, along with color tolerances, are stored in a reference file. The test program is executed in which the output image and the reference image are then compared one checking aperture at a time. Any differences between the two images are then stored in an errors file which contains significant differences between the reference image and the output image for a particular computer platform.

26 Claims, 4 Drawing Sheets

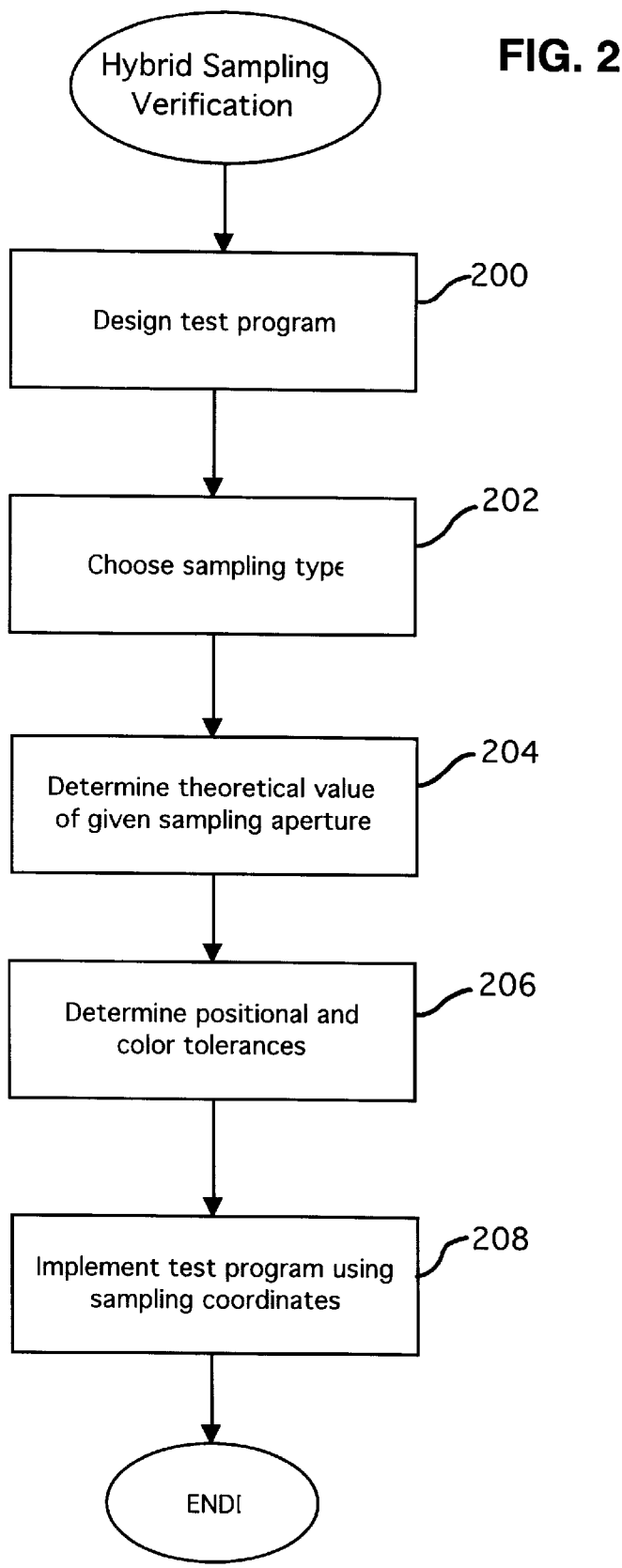

METHOD AND APPARATUS FOR HYBRID SAMPLING IMAGE VERIFICATION

BACKGROUND OF THE INVENTION

1. Field of Invention

The present invention relates to the field of computer software and computer program testing. More specifically, it relates to verification of graphics images produced by a computer graphics program.

2. Discussion of Related Art

In the computer software industry, the amount of time needed to test software products, specifically computer graphics programs, has become a significant bottleneck in the product development timeline. The testing cycle for graphics programs, where images typically must undergo thousands of tests, presently takes several weeks. The test cycle is typically conducted after the software product has been completed by the developer and must be completed before the product is released.

With a typical computer graphics program, the test engineer must verify that the software produces output images, as expected, with no significant errors. The images generated by the computer program must be within an acceptable range of images described in the program's specification. Regardless of how confident application developers are with the integrity and performance of the software, before the software is commercially released, test data is needed to support the assertion that the product runs as expected. The bottleneck occurs in creating this test data. by the increasing complexity of graphics libraries, which contain routines to generate images and is required when running a graphics program.

Efforts to reduce the number of reference images have led to other drawbacks which can be explained by the fact that computer graphics use mathematical models to simulate scence designed by the user. Whenever mathematical approximations are used, there are going to be errors involved. With image comparison verification, because one of the goals is to reduce the number of reference images, test engineers tend to combine many test programs into one test frame. This increases the error margin in the test engineer's prediction of the expected image, since a higher number of mathematical models is used in one test frame. Consequently, the test engineer usually describes the expected output image using general terms, such as "a shaded red square with white shading in the lower right corner." The problem with this type of description is that different people looking at the same image may focus on different areas and may focus on portions different from the portion focused on by the test engineer designing the test case.

Another time-consuming factor arises from a pixel being in error due to more than one bug in the graphics program. Cumulative errors may cause a pixel in an output image to be different from a pixel in a reference image. A senior engineer typically has to make a judgment call as to the significance of that pixel. Because some errors are more significant than others, it must be determined which errors can be ignored and which ones need to be addressed. This determination typically requires the experience of a senior test engineer, who also cannot always determine which errors are significant and which ones are not.

FIGS. 1a–c show the different images needed for image comparison verification in the prior art. FIG. 1a shows a screen shot of a typical reference image of various geometric shapes and lines. FIG. 1b is a screen shot of a typical corresponding output image which is to be tested against the reference image of FIG. 1a. FIG. 1c is a screen shot of an image showing the differences, pixel by pixel, between the output and reference images.

As is evident from the discussion above, there are several significant drawbacks from using traditional image comparison testing. First, each hardware/software configuration requires a separate set of reference images resulting in a proliferation of images. Second, the testing method does not provide qualitative information on failed cases. There is a need to generate a new set of reference images whenever there is a new hardware/software configuration for the program. Third, since there are many possibilities or reasons a test may fail it is necessary to have a senior test engineer supervise the error checking step. Finally, there is no room for error tolerance which would eliminate insignificant or "don't care" type rendering differences between the images.

Another method of testing computer graphics programs is referred to as sample point testing. With this type of testing, pixel values are hardcoded in the test programs and are given only a color tolerance. The test data determines what type of testing is going to be applied to that pixel and the area around that pixel (the location of the center of the area is hardcoded in the test program). However, the hardcoded values of the pixels apply only to a particular hardware/software configuration.

A major problem arises in that maintaining and updating the test programs is a very time consuming and error prone procedure. Essentially, the test program code has to be changed every time there is any type of update. Having the hard coded expected values of selected points contained within the test program itself makes the test platform dependent. Thus, the significant shortcomings of sample point verification are that it provides limited error checking and that the expected values of the points are bard coded into the test program. Even error tolerances which may be included in the test program cannot be modified for individual test cases without having to modify the test program itself.

Therefore, what is needed is a method of testing computer graphics programs that is efficient and eliminates insignificant rendering differences. It would also be desirable to have a testing methodology in which the errors can be identified and qualified with a high degree of confidence and, at the same time, not require a high level of maintenance of reference images. It is also desirable to have more modular type testing so that errors can be identified and corrected in less time.

SUMMARY OF THE INVENTION

To achieve the foregoing and in accordance with the purpose of the present invention, methods, systems, and software for testing the accuracy of images generated by computer graphics programs are disclosed. An output image is verified by being compared to a reference image, also known as the golden image. In one aspect of the present invention, the image to be tested, referred to as the output image, is partitioned into several checking apertures. A checking aperture can be of either a block type or a point type. In either case, each checking aperture is made up of several pixels. One or more attributes of the output image is compared against the reference image. For pixels in a point type checking aperture, a positional tolerance is determined. Expected values of pixels in the reference image are then derived by examining the specification of the computer graphics program. The positional tolerances and the expected values are stored in a reference file. A test program is executed in which the output image and the reference image are then compared. Any differences between the two images are then stored in an errors file.

In another embodiment, the reference image and the output image are compared in increments of checking apertures. A checking aperture from the output image is mapped onto the corresponding checking aperture in the reference image. In yet another embodiment, a color tolerance is determined for each pixel in a block type checking aperture.

In another embodiment, a reference file including positional tolerances, color tolerances, and expected values of pixels is created for each computer platform that the graphics program is being tested on, thereby resulting in a set of reference files. Upon execution of a test program to check the accuracy of the output image, the reference file is invoked and an errors file is created. The tolerances are set based on acceptable deviations of color and position of pixels in the output image from the corresponding pixels in the reference image. The errors file contains differences between the output image and the reference image that remain after taking into account the positional and color tolerances.

In another aspect, the present invention provides a computer system for verifying the accuracy of an image created by a computer graphics program. An image partitioner device is used to partition an output image into a plurality of checking apertures, where each aperture can be either a block type or a point type aperture, and is made up of several pixels. A verifying device is used to verify one or more attributes of the output image against a reference image by comparing the two images in aperture increments. A measuring device is used to determine a positional tolerance of each pixel in all point type checking apertures. An estimator is used to derive expected values of pixels in the reference image. The positional tolerances and expected values, as well as color tolerances, are stored in a reference file by a first storage mechanism. A second storage mechanism stores any differences between the reference image and the output image in an errors file. The errors file is created upon execution of a test program, which also invokes the reference file.

BRIEF DESCRIPTION OF THE DRAWINGS

The invention, together with further advantages thereof, may best be understood by reference of the following description taken in conjunction with the accompanying drawings in which:

FIG. 1b is a screen shot of a typical prior art corresponding output image which is to be tested against the reference image of FIG. 1 a.

FIG. 2 is a flowchart showing a process of developing a test program using hybrid sampling image verification of the present invention.

DETAILED DESCRIPTION OF THE PREFERRED EMBODIMENTS

Figure 1A:
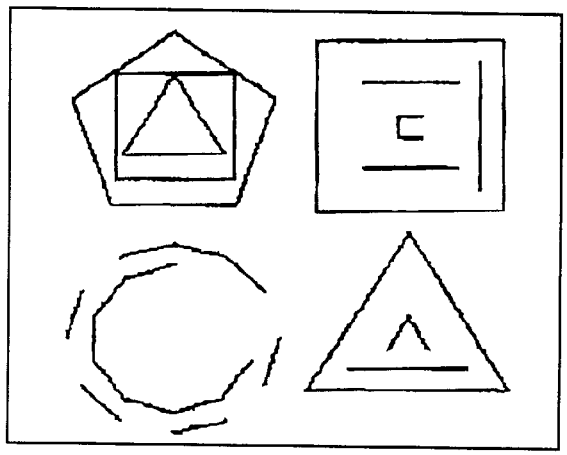
FIG. 1a shows a screen shot of a typical prior art reference image of various geometric shapes and lines.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

As discussed above, related testing methodologies for verifying computer graphics programs have several significant drawbacks that make them unsuitable for meeting newly emerging industry standards for graphics software testing. For example, with image comparison, each hardware/software configuration requires a separate set of reference images resulting in a proliferation of images. Another significant drawback is that such methods do not provide qualitative information on failed tests. Thus, the test engineer must spend valuable time sifting through failures that are not significant. The other lesser used method, sample point verification, provides limited error checking. In addition, the expected values of the pixels are hardcoded in the test program. Even error tolerances included in the test program cannot be modified without having to modify the test program itself.

The advantages of hybrid sampling image verification are that it provides color and positional tolerances which allow the test program to use one master reference data file on nearly all hardware configurations and software implementations. This feature also allows manipulation of both positional and color tolerances down to the sampling area or check aperture level through the reference data file. In addition, the expected values and tolerances are separate from the test program itself. Thus, the tester can create special reference data files on certain test cases involving custom hardware without changing the test program or changing the tolerances for all test cases. This also eliminates the need to regrade the reference data file whenever a new hardware or software implementation is introduced. Related to this, it is possible to do more modular testing. The test cases only contain a limited set of mathematical models. It is generally easier for less experienced test engineers to understand the underlying algorithms and to set reasonable error tolerances. Finally, because errors exposed by this verification method are more likely to be legitimate or significant errors, test engineers are less likely to overlook them with hybrid sampling. In other words, when there is a failure in one of the tests, the failure is very likely to be significant.

The reference data file represents a reference image which is typically equivalent to what is referred to as a golden image, and is created during the initial implementation time frame, ie., when the application developers are still debugging the application. With conventional methods, the reference images were created at a later stage when most of the features had already been implemented and are in working condition. At this stage it is very difficult to go back and correct bugs or errors found in the application. It is well recognized in the testing field that the most efficient way to fix a programming bug is to expose the bug soon after the features being tested were implemented. This allows the developer to fix the bug shortly after the program was coded. Consequently, while they still have full understanding of the logic related to the features being tested; the time between the discovery of the bug and the time the problem is fixed is minimized.

Given that hybrid sampling image testing is a method of testing attributes of pixels, it does not require an exact pixel value match. Hybrid sampling testing uses a theoretical image, i.e., the reference image, that is constructed from the test engineer's understanding of what the golden image should look like as determined from the specification. Thus, with hybrid sampling testing, a reference data file used in the testing procedure is automatically generated.

Hybrid sampling verification uses a reference data file similar to . reference image files used in traditional image comparison. However, instead of only containing pixel color information, it also contains data on both color and positional tolerances of each pixel in each sample area, referred to as checking apertures. The method uses two types of checking apertures: point sampling and block sampling. Tolerance information regarding the pixels in the checking aperture is separated from the test program itself. Thus, the test program contains location information of the checking aperture and the reference data file contains information about the expected RGB color values, check aperture type and, positional and color tolerances. In the described embodiment, the reference data file contains information on the expected RGB color values, one digit for the check aperture type and positional tolerance, and another digit for the color tolerance.

In hybrid sampling testing, only selected check apertures are evaluated. The test engineer only needs to do comparisons on certain user assigned pixels instead of an entire image. By having positional tolerances as well as color tolerances, the test program will indicate a "pass" as long as the pixels that shift do not move outside the positional tolerance range. In the described embodiment, the test engineer should understand the purpose of each test so that he can select the right sample points and tolerances. By isolating the attributes it is easier to pinpoint any errors that might occur. Thus, when a test program fails it is important that the test engineer understand what the test program is trying to do or what attribute it is testing. This allows the test engineer to follow basic debugging procedures and focus quicker on the failure. The test engineer should know what the image is expected to look like. Thus, the test engineer must understand the algorithm creating a particular attribute of the image being tested before running the test program. Thus, if there is a failure in the first run, there is a high degree of certainty that there is an error in the application. This was not true with prior methods of testing in which the first run always resulted in a failure but did not necessarily mean something was wrong with the application. In those cases, the test engineer had to show the failure to the developer after the first run to modify or adjust the image. With the described method, it is easier for junior test engineers to understand the underlying algorithm creating the image and to set reasonable error tolerances.

In hybrid sampling image testing, the reference data file used in the testing is nearly equivalent to the golden image data file. Thus, the golden data file can be used to test the application. As mentioned above, in the described embodiment, the reference data file contains RGB values for pixels in checking apertures, frame numbers, and positional and color tolerances for each sampling aperture. The aperture can be either a point type aperture, which is essentially a single reference pixel and its surrounding pixels, or a block pixel area. If the aperture is a block, the pixels must also have the same RGB value or have an RGB value within the color tolerance of the block aperture.

FIG. 2 is a flowchart showing a process of developing a test program using hybrid sampling image verification of the present invention. It is generally desirable to keep a test program as simple as possible. Thus, a single test program typically tests one attribute or a related group of attributes based on mathematical models in the reference image. At the same time it is desirable to test as many attributes in one test program without sacrificing modularity and simplicity.

At block 200 of FIG. 2 the test engineer designs a test program using hybrid sampling verification. The test engineer decides which attributes will be tested together or separately in the test programs. This form of modular testing is particularly important given the increasing complexity of graphics libraries. A test program checks certain attributes of the image. Preferably, the number of attributes tested in one test case is kept low, but can be as high as 50 attributes so long as the attributes are related. The test cases make up what is referred to as a test frame. Typically there are 7,000 test frames that need to run when testing a graphics application.

In block 202 the test engineer chooses a checking aperture type. The type can be either a block aperture or a point aperture. With block apertures the actual sampling point is the center of the sampling block. With block type checking, positional tolerances do not apply since all pixels in the block must meet the expected value for the test to pass. Thus, a positional tolerance is unnecessary in a block aperture test since all the pixels in the block must match the reference color value within the color tolerance. A block is typically a three pixel by three pixel square or seven by seven square represented by a center reference pixel. In the described embodiment, a block is represented by the location of the center pixel and the length of one side of the square aperture.

With point aperture testing, a single pixel, representing the "point," has both positional and color tolerances. With block type testing all pixels within the checking aperture have to match the reference color value within the specified color tolerance. With point type checking only one pixel within the checking aperture must match the reference color value within the specified color tolerance. The positional tolerance for point type checking can be zero, one or two pixels. That is, in the described embodiment the pixel or point being checked can be one or two pixel-lengths away from a pixel which passes the test.

At block 204 the theoretical or expected values of pixels in a particular checking aperture are determined. This is done based on the specification of the application program. From this specification the test engineer can determine the expected values of pixels in checking apertures in the reference image. For example, the specification can indicate that for a certain checking aperture in the reference image the RGB value should be a particular value or be within a particular range. For example, if the image is an outdoor scene with a blue sky, the test engineer knows that pixels in certain portions of the image represented by one or more checking apertures should have an RGB value indicating blue for the checking apertures. The test engineer can also look at certain algorithms or equations such as lighting equations to determine what attributes a particular check aperture should have in the image.

At block 206 positional and color tolerances for pixels in the checking apertures are determined. In the described embodiment, the color tolerance is expressed as a percentage variation from the expected RGB value for a particular pixel. Characteristics of the sample aperture are also considered in determining the color tolerance. Using the earlier example, if a checking aperture is known to be all blue, e.g. a blue sky, the color tolerance may be set low. Checking apertures that are within areas in the reference image that have, for example, a complex depth value may have more tolerance than an a checking aperture that is more uniform or simple. In one sense, if the calculation or algorithm necessary to compute the attributes or color of pixels in a checking aperture is complicated, the pixels in the area are given a greater tolerance.

With block type apertures, the positional tolerance is essentially the size of the checking aperture. The positional and color tolerances give tests done under hybrid sampling verification a very high confidence level. Thus, when there is a failure, an application developer or the test engineer must look at the problem because the image failed a test that already had tolerances factored in. As a result, application developers and test engineers spend more time with significant errors or rendering differences and less time with minor variations.

Figure 1B:
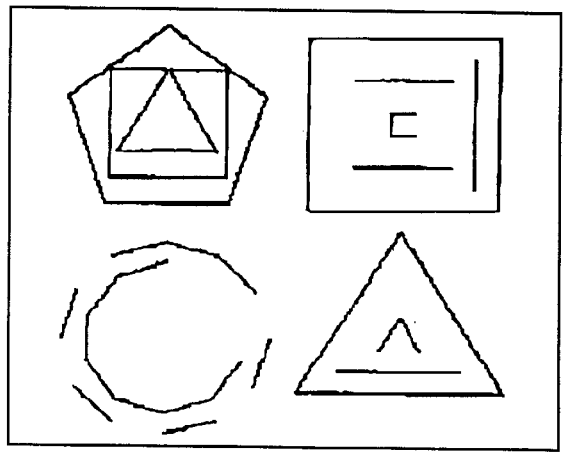
Figure 1C:
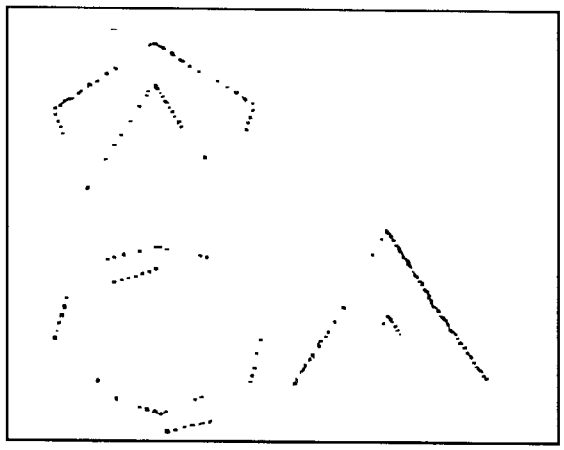
FIG. 1c is a screen shot of a prior art image showing the differences, pixel by pixel, between the output and reference images.

At block 208 the test program is implemented using the checking apertures. The test programs were developed in blocks 200 to 206. At block 208 the test program is executed. By running the test, a list of differences for each checking aperture is created showing significant variations between points in the reference data file and the output image. By running a test program, an image representing the current test case will be generated on the screen. The differences list, if any, is typically generated on a separate portion of the screen. This is shown in FIG. 1c. The input to the test program is the golden data file as shown in FIG. 1a and an output (FIG. 1b) image which is compared to the golden data file. If the image which is shown on the screen fails, the test engineer can be certain there is a significant error in the output image given that positional and color tolerances are factored into the golden data file.

Figure 3:
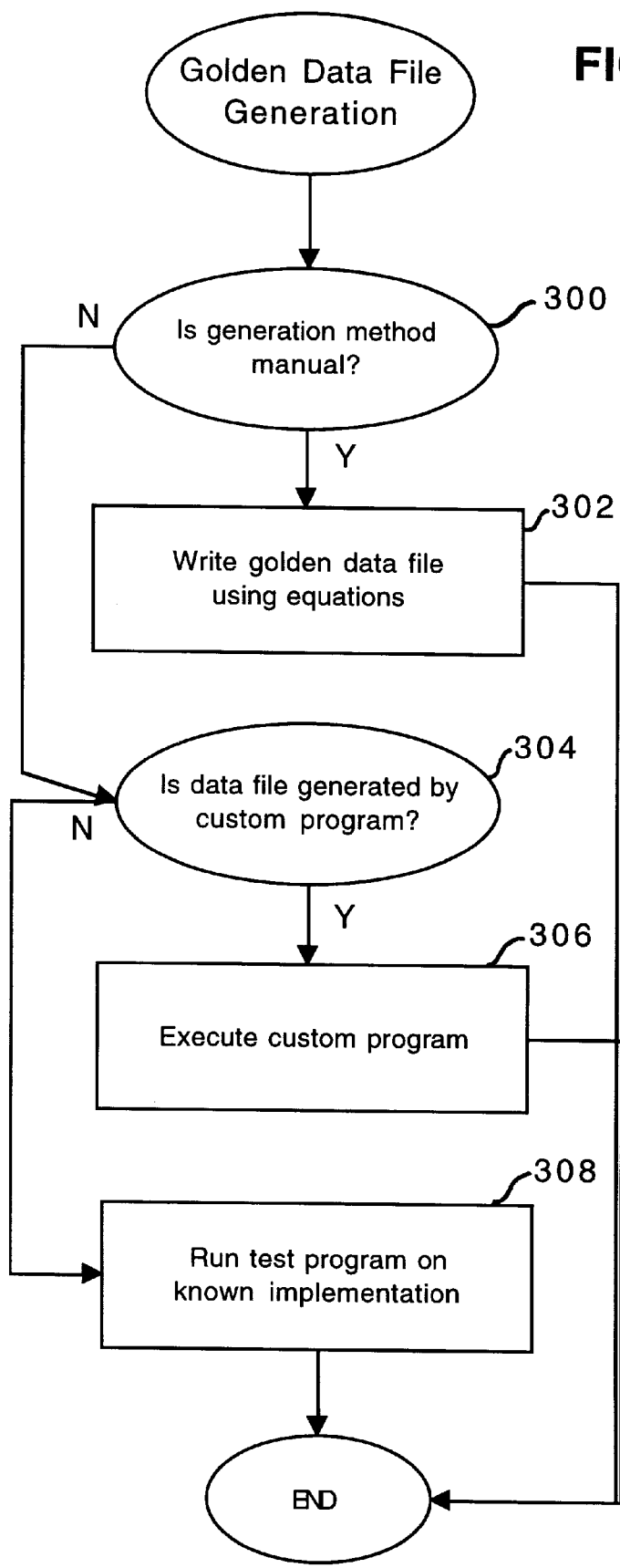
FIG. 3 is a flowchart showing a process of generating a golden data file which is used as a reference image in a preferred embodiment.

FIG. 3 is a flowchart showing a process of generating a golden data file which is used as a reference image in a preferred embodiment. The golden data file stores the expected values of pixels in the checking apertures and color and positional tolerances of the apertures. At block 300 of FIG. 3 the test engineer determines whether to generate the golden data file manually. In this case, the test engineer writes the golden data file manually using equations and algorithms from the specification as shown in block 302. As mentioned above, the golden data file or reference data file of the described embodiment contains RGB values, followed by a positional tolerance if a point aperture is being checked or a block size if the test is using a block aperture. Next, a color tolerance is expressed as a percentage value. This data is repeated for each frame in the image. If the golden data file is not generated manually, it is generated using a custom-developed program typically provided by the test engineer. The custom program is then run or executed at block 306. If the golden data file is not generated using a custom program the test program is run on a known implementation as shown in block 308. At block 308 the test program that was prepared in FIG. 2 is run on a known implementation which is essentially the golden data file. This can be done because the confidence level in the image is high enough for us to run the test program on the known implementation.

As mentioned above, a golden data file, i.e. a reference image, is created when using hybrid sampling image testing. The golden data file represents an image described by the program specification and, therefore, closely resembles the image expected to be generated by the graphics application. The image is not an exact replica since the exact RGB values of all the pixels in the check aperture typically cannot be derived from the specification.

Tolerances of pixels in checking apertures can be determined by examining transformations. The changes in attributes between two check points whose exact values are known are examined. The area between the check points can be examined and its values derived by examining the specification. In the described embodiment, color tolerances are in the range of 1% to 2%.

When a test program fails, the test engineer can determine which checking aperture was in error. This greatly facilitates correcting the error. This is in contrast to traditional image comparison methods in which there were no tolerances leading to failures even though the variations were acceptable. In addition, with hybrid sampling, tolerances in each checking aperture can be adjusted without having to update the test program itself.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, executing, downloading, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method steps for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method steps.

Figure 4:
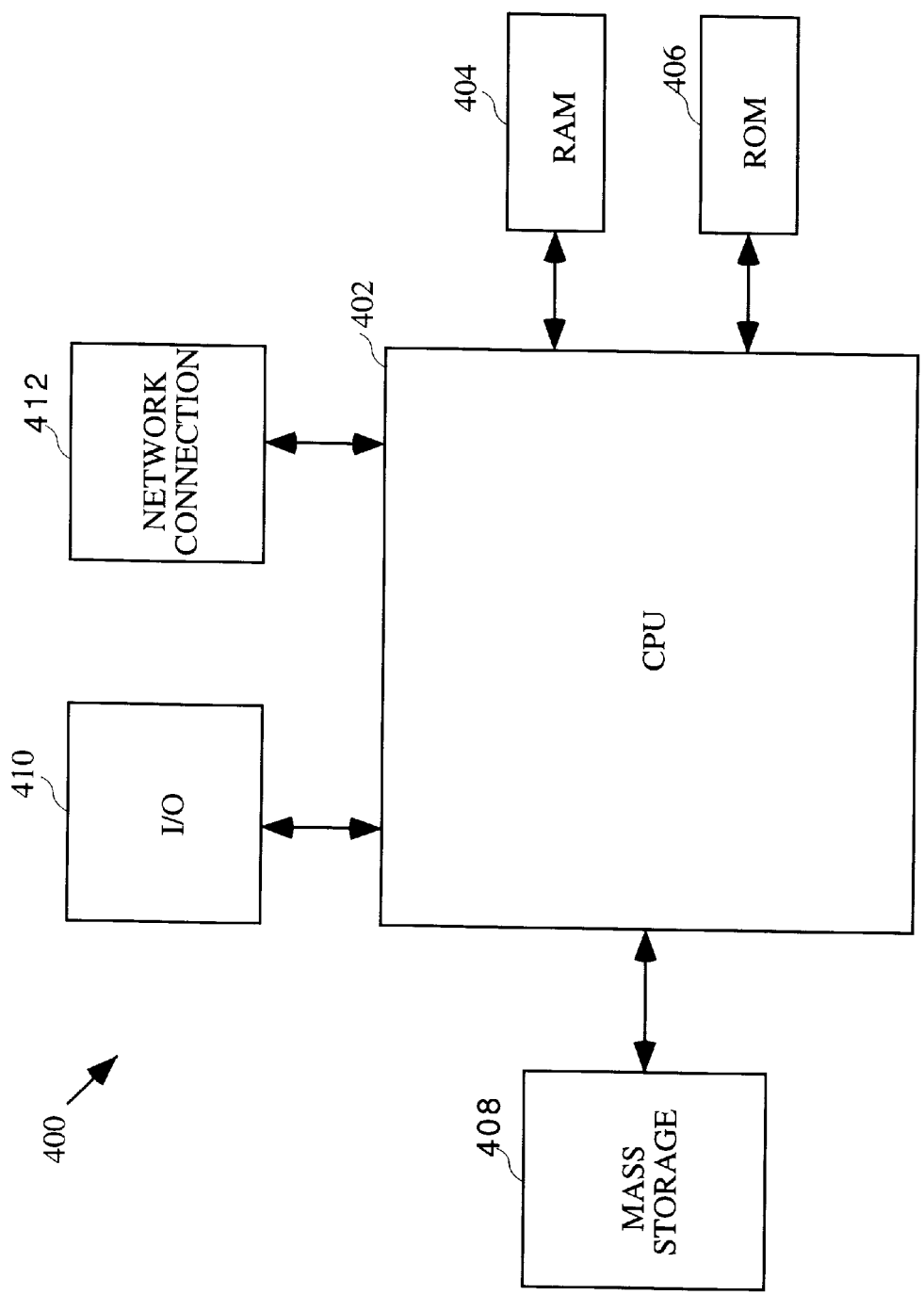
FIG. 4 is a schematic illustration of a general purpose computer system suitable for implementing the present invention.

FIG. 4 is a schematic illustration of a general purpose computer system suitable for implementing the present invention. The computer system includes a central processing unit (CPU) 402, which CPU is coupled bi-directionally with random access memory (RAM) 404 and uni-directional with read only memory (ROM) 406. Typically RAM 404 includes programming instructions and data, including text objects as described herein in addition to other data and instructions for processes currently operating on CPU 402. ROM 606 typically includes basic operating instructions, data and objects used by the computer to perform its functions. In addition, a mass storage device 408, such as a hard disk, CD ROM, magneto-optical (floptical) drive, tape drive or the like, is coupled bi-directionally with CPU 402. Mass storage device 408 generally includes additional programming instructions, data and text objects that typically are not in active use by the CPU, although the address space may be accessed by the CPU, e.g., for virtual memory or the like. Each of the above described computers further includes an input/output source 410 that typically includes input media such as a keyboard, pointer devices (e.g., a mouse or stylus) and the like. Each computer can also include a network connection 412 over which data, including, for example, objects, files, and instructions, can be transferred. Additional mass storage devices (not shown) may also be connected to CPU 402 through network connection 412. It will be appreciated by those skilled in the art that the above described hardware and software elements are of standard design and construction.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the golden data file used as a reference data file can be generated manually or by a custom program written by the test engineer. In another example, test programs can be written to verify a single attribute of the image or a group of related attributes depending on the desired level of modularity. Accordingly, the present embodiments are to be considered as illustrative and not restrictive, and the invention is not to be limited to the details given herein, but may be modified within the scope and equivalents of the appended claims.

What is claimed is:

1. A method of testing an output image for variations from a reference image, the method comprising:

partitioning an output image into a plurality of checking apertures wherein each checking aperture includes a plurality of pixels and a selected one of the checking apertures is a point type checking aperture;

determining a positional tolerance of each pixel in the point type checking aperture and setting a single pixel in such checking aperture as a reference pixel;

deriving expected values of pixels in the reference image; and storing the positional tolerance of each pixel in the point type checking aperture in a reference file and the expected values of pixels in the reference image in the reference file;

wherein the reference file is opened upon execution of a test program thereby generating a comparison between the reference image and the output image.

2. A method as recited in claim 1 wherein the selected one of the checking apertures is a block type checking aperture.

3. A method as recited in claim 2 further including determining a color tolerance of each pixel in the block type checking aperture.

4. A method as recited in claim 1 wherein determining a positional tolerance of each pixel further includes determining a color tolerance of each pixel in the point type checking aperture.

5. A method as recited in claim 4 wherein the color tolerance and positional tolerance of each pixel in the checking aperture are set based on acceptable deviations of pixels in the output image from corresponding pixels in the reference image.

6. A method as recited in claim 1 wherein deriving the expected values of pixels in the reference image further includes examining a specification of a program that generates the reference image.

7. A method as recited in claim 1 wherein storing the positional tolerances and the expected values in the reference file further includes creating a plurality of reference files, such that each reference file corresponds to a particular computer platform.

8. A method as recited in claim 1 wherein storing the positional tolerances and the expected values in the reference file further includes storing a color tolerance of each pixel in the point type checking aperture in the reference file.

9. A method as recited in claim 1 wherein upon execution of the test program, at least one attribute of the reference image is verified against the output image.

10. A method as recited in claim 9 further including comparing a portion of the output image to a corresponding portion of the reference image wherein such portion is represented by one such checking aperture of the plurality of checking aperatures.

11. A method as recited in claim 9 further including mapping the output image onto the reference image.

12. A method as recited in claim 1 wherein storing the positional tolerances and the expected values in the reference file further includes predefining the reference file.

13. A method as recited in claim 1 further including storing any differences between the reference image and the output image in an error file.

14. A method as recited in claim 1 wherein the test program contains location data on such checking aperture of the plurality of checking aperatures.

15. A system for testing an output image for variations from a reference image, the system comprising:

an image partitioning device for partitioning an output image into a plurality of checking apertures wherein each checking aperture includes a plurality of pixels and a selected one of the checking apertures is a point type checking aperture and a reference setter for setting a single pixel in such checking aperture as a reference pixel;

a measuring device for determining a positional tolerance of each pixel in the point type checking aperture;

an estimator for deriving expected values of pixels in the reference image; and a storage mechanism for storing the positional tolerance of each pixel in the point type checking aperture in a reference file and the expected values of pixels in the reference image in the reference file;

wherein the reference file is opened upon execution of a test program thereby generating a comparison between the reference image and the output image.

16. A system as recited in claim 15 wherein the selected one of the checking apertures is a block type checking aperture.

17. A system as recited in claim 15 wherein the measuring device further includes a color measuring device for determining a color tolerance of each pixel in the point type checking aperature.

18. A system as recited in claim 17 wherein the color tolerance and positional tolerance of each pixel in the point type checking apertures are set based on acceptable deviations of pixels in the output image from corresponding pixels in the reference image.

19. A system as recited in claim 15 wherein the storage mechanism further includes a reference file creator for creating a plurality of reference files, such that each reference file corresponds to a particular computer platform.

20. A system as recited in claim 15 wherein the storage mechanism further includes a color tolerance storage mechanism for storing a color tolerance of each pixel in the point type checking aperture in the reference file.

21. A system as recited in claim 15 further including an attribute verifier for verifying at least one attribute of the reference image against the output image upon execution of the test program.

22. A system as recited in claim 21 wherein the attribute verifyier further includes a comparator for comparing a portion of the output image to a corresponding portion of the reference image wherein such portion is represented by one such checking aperture of the plurality of checking aperatures.

23. A system as recited in claim 21 wherein the attribute verifier further includes a mapping device for mapping the output image onto the reference image.

24. A system as recited in claim 15 wherein the test program contains location data on one such checking aperture of the plurality of checking aperatures.

25. A computer-readable medium comprising computer-readable program code configured to cause a computer to execute the steps of:

partitioning an output image into a plurality of checking apertures wherein each checking aperture includes a plurality of pixels and a selected one of the checking apertures is a point type checking aperture;

determining a positional tolerance of each pixel in a selected point type checking aperture and setting a single pixel in such checking aperture as a reference pixel;

deriving expected values of pixels in the reference image; and storing the positional tolerance of each pixel in the point type checking aperture in the reference file and the expected values of pixels in the reference image in a reference file;

wherein the reference file is opened upon execution of a test program thereby generating a comparison between the reference image and the output image.

26. A method of testing a computer-generated image for variations from a reference image, the method comprising:

partitioning an output image into a plurality of checking apertures wherein each checking aperture includes a plurality of pixels and is either a point type or a block type;

creating a test program for verifying one or more attributes of the output image against a reference image;

determining a positional tolerance and a color tolerance of each pixel in a checking aperture if the checking aperture is a point type and determining a color tolerance of each pixel in a checking aperture if the checking aperture is a block type;

deriving an expected value of each pixel in a checking aperture wherein the expected value is derived according to predetermined characteristics of the reference image;

generating a reference file for storing the positional tolerance and color tolerance of each pixel in the checking aperture and the expected value of each pixel in the checking aperture; and executing the test program thereby opening the reference file and generating an errors file for storing differences found between the reference image and the output image.

* * * * *

UNITED STATES PATENT AND TRADEMARK OFFICE
CERTIFICATE OF CORRECTION

PATENT NO.     : 6,226,406 B1
DATED          : May 1, 2001
INVENTOR(S)    : Hsieh It is certified that error appears in the above-identified patent and that said Letters Patent is hereby corrected as shown below:

Column 2,
Line 37, change "bard" to -- hard --.

Signed and Sealed this

Eleventh Day of December, 2001

Attest:

NICHOLAS P. GODICI
*Acting Director of the United States Patent and Trademark Office*

*Attesting Officer*